United States Patent
Campbell et al.

(10) Patent No.: US 9,200,851 B2
(45) Date of Patent: Dec. 1, 2015

(54) PRESSURE CONTROL UNIT AND METHOD FACILITATING SINGLE-PHASE HEAT TRANSFER IN A COOLING SYSTEM

(71) Applicant: INTERNATIONAL BUSINESS MACHINES CORPORATION, Armonk, NY (US)

(72) Inventors: Levi A. Campbell, Poughkeepsie, NY (US); Richard C. Chu, Hopewell Junction, NY (US); Michael J. Ellsworth, Jr., Lagrangeville, NY (US); Madhusudan K. Iyengar, Foster City, CA (US); Robert E. Simons, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 350 days.

(21) Appl. No.: 13/785,275

(22) Filed: Mar. 5, 2013

(65) Prior Publication Data
US 2013/0180686 A1 Jul. 18, 2013

Related U.S. Application Data

(62) Division of application No. 12/556,019, filed on Sep. 9, 2009, now abandoned.

(51) Int. Cl.
*F28D 15/00* (2006.01)
*G05D 16/20* (2006.01)

(52) U.S. Cl.
CPC .............. *F28D 15/00* (2013.01); *G05D 16/202* (2013.01)

(58) Field of Classification Search
CPC ................................. F28F 27/00; F28D 15/00

USPC ................................. 236/92 R; 165/200, 279
See application file for complete search history.

(56) References Cited

U.S. PATENT DOCUMENTS 3,578,014 A 5/1971 Gachot
3,836,786 A 9/1974 Lowther
(Continued)

OTHER PUBLICATIONS

Zamanabadi et al, "Hybrid Control Challenges in Refrigeration Systems", Danfoss A/S, Denmark, Advanced Engineering—Refrigeration and Air Conditioning, EECI (2007).
(Continued)

*Primary Examiner* — Marc Norman
(74) *Attorney, Agent, or Firm* — Steven Chiu, Esq.; Kevin P. Radigan, Esq.; Heslin Rothenberg Farley & Mesiti P.C.

(57) ABSTRACT

A pressure control unit and method are provided for facilitating single-phase heat transfer within a liquid-based cooling system. The pressure control unit includes a pressure vessel containing system coolant, and a pressurizing mechanism associated with the pressure vessel. A coolant line couples system coolant in the pressure vessel in fluid communication with the coolant loop of the cooling system, and a regulator mechanism couples to the pressurizing mechanism to maintain pressure within the pressure vessel at or above a defined pressure threshold, thus maintaining pressure within the coolant loop above the pressure threshold. The defined pressure threshold is set to facilitate system coolant within the coolant loop remaining single-phase throughout an operational temperature range of the system coolant within the coolant loop. More particularly, the pressure threshold is set to ensure pressure of system coolant within the coolant loop remains above the coolant's saturation pressure at maximum operational temperature.

8 Claims, 8 Drawing Sheets

(56) References Cited

U.S. PATENT DOCUMENTS

| | | | |
|---|---|---|---|
| 3,859,166 A | 1/1975 | Flynn et al. | |
| 4,325,296 A | 4/1982 | Ukai et al. | |
| 4,430,866 A | 2/1984 | Willitts | |
| 4,664,877 A | 5/1987 | Magee et al. | |
| 4,707,324 A | 11/1987 | Storrick | |
| 5,116,207 A | 5/1992 | Doolittle et al. | |
| 5,385,202 A | 1/1995 | Drosdziok et al. | |
| 5,491,649 A | 2/1996 | Friday et al. | |
| 5,634,350 A | 6/1997 | De Medio | |
| 5,782,101 A | 7/1998 | Dennis | |
| 5,829,264 A | 11/1998 | Ishigaki et al. | |
| 5,859,885 A | 1/1999 | Rusnica et al. | |
| 5,881,801 A * | 3/1999 | Hayakawa et al. | 165/104.24 |
| 5,937,661 A | 8/1999 | Kishimoto et al. | |
| 6,212,895 B1 | 4/2001 | Richardson | |
| 6,574,104 B2 | 6/2003 | Patel et al. | |
| 6,866,092 B1 | 3/2005 | Molivadas | |
| 6,973,793 B2 | 12/2005 | Douglas et al. | |
| 7,012,807 B2 | 3/2006 | Chu et al. | |
| 7,032,611 B1 | 4/2006 | Sheng | |
| 7,088,585 B2 | 8/2006 | Chu et al. | |
| 7,096,679 B2 | 8/2006 | Manole | |
| 7,106,590 B2 | 9/2006 | Chu et al. | |
| 7,143,605 B2 | 12/2006 | Rohrer et al. | |
| 7,191,954 B2 | 3/2007 | Kline | |
| 7,222,502 B2 | 5/2007 | Kobayashi et al. | |
| 7,309,209 B2 | 12/2007 | Amiot et al. | |
| 7,315,448 B1 | 1/2008 | Bash et al. | |
| 7,349,213 B2 | 3/2008 | Campbell et al. | |
| 7,365,973 B2 | 4/2008 | Rasmussen et al. | |
| 7,385,810 B2 | 6/2008 | Chu et al. | |
| 7,392,823 B2 | 7/2008 | Dong et al. | |
| 7,415,835 B2 | 8/2008 | Cowans et al. | |
| 7,418,825 B1 | 9/2008 | Bean, Jr. | |
| 7,420,808 B2 | 9/2008 | Campbell et al. | |
| 7,477,514 B2 | 1/2009 | Campbell et al. | |
| 7,531,142 B2 | 5/2009 | Huziwara et al. | |
| 7,559,207 B2 | 7/2009 | Knight et al. | |
| 7,715,194 B2 | 5/2010 | Brewer et al. | |
| 7,810,679 B2 | 10/2010 | Wauters et al. | |
| 7,895,854 B2 | 3/2011 | Bash et al. | |
| 7,903,409 B2 | 3/2011 | Patel et al. | |
| 7,944,694 B2 | 5/2011 | Campbell et al. | |
| 7,961,475 B2 | 6/2011 | Campbell et al. | |
| 7,963,119 B2 | 6/2011 | Campbell et al. | |
| 8,018,718 B2 | 9/2011 | Goth et al. | |
| 8,018,720 B2 | 9/2011 | Campbell et al. | |
| 8,208,258 B2 | 6/2012 | Campbell et al. | |
| 8,322,154 B2 | 12/2012 | Campbell et al. | |
| 2001/0042571 A1 | 11/2001 | Fang et al. | |
| 2002/0149909 A1 | 10/2002 | Konstad et al. | |
| 2003/0057546 A1 | 3/2003 | Memory et al. | |
| 2005/0115257 A1 | 6/2005 | Goth et al. | |
| 2005/0244280 A1 | 11/2005 | Malone et al. | |
| 2006/0126296 A1 | 6/2006 | Campbell et al. | |
| 2006/0180300 A1 | 8/2006 | Lenehan et al. | |
| 2007/0119570 A1 | 5/2007 | Kuo et al. | |
| 2007/0213881 A1 | 9/2007 | Belady et al. | |
| 2007/0297136 A1 | 12/2007 | Konshak | |
| 2008/0205003 A1 | 8/2008 | Belady | |
| 2009/0080173 A1 | 3/2009 | Schmidt et al. | |
| 2009/0126909 A1 | 5/2009 | Ellsworth, Jr. et al. | |
| 2009/0126910 A1 | 5/2009 | Campbell et al. | |
| 2009/0133866 A1 | 5/2009 | Campbell et al. | |
| 2010/0032142 A1 | 2/2010 | Copeland et al. | |
| 2010/0263855 A1 | 10/2010 | Arimilli et al. | |
| 2011/0029152 A1 | 2/2011 | Patel | |
| 2011/0056225 A1 | 3/2011 | Campbell et al. | |
| 2011/0056674 A1 | 3/2011 | Campbell et al. | |
| 2011/0056675 A1 | 3/2011 | Barringer et al. | |
| 2011/0058637 A1 | 3/2011 | Campbell et al. | |
| 2011/0060470 A1 | 3/2011 | Campbell et al. | |
| 2013/0186612 A1 | 7/2013 | Barringer et al. | |

OTHER PUBLICATIONS

Campbell et al., Office Action for U.S. Appl. No. 12/556,066, filed Sep. 9, 2009 (U.S. Patent Publication No. 2011/0060470 A1), dated Aug. 31, 2011.

Campbell et al., Office Action for U.S. Appl. No. 12/556,053, filed Sep. 9, 2009 (U.S. Pat. No. 8,208,258 B2), dated Dec. 21, 2011.

Campbell et al., Notice of Allowance for U.S. Appl. No. 12/556,053, filed Sep. 9, 2009 (U.S. Pat. No. 8,208,258 B2), dated Feb. 16, 2012.

Campbell et al., Office Action for U.S. Appl. No. 12/556,066, filed Sep. 9, 2009, (U.S. Patent Publication No. 2011/0060470 A1), dated Mar. 22, 2012.

Campbell et al., Notice of Allowance for U.S. Appl. No. 12/556,031, filed Sep. 9, 2009, (U.S. Pat. No. 8,322,154 B2), dated Jul. 24, 2012.

Campbell et al., Office Action for U.S. Appl. No. 12/556,066, filed Sep. 9, 2009, (U.S. Patent Publication No. 2011/0060470 A1), dated Aug. 27, 2012.

Campbell et al., Office Action for U.S. Appl. No. 12/556,019, filed Sep. 9, 2009, (U.S. Patent Publication No. 2011-0058637 A1), dated Nov. 2, 2012.

Campbell et al., Office Action for U.S. Appl. No. 12/556,019, filed Sep. 9, 2009 (U.S. Patent Publication No. 2011/0058637 A1), dated May 23, 2013 (pp. 1-17).

Barringer et al., Final Office Action for U.S. Appl. No. 13/447,457, filed Apr. 16, 2012 (U.S. Patent Publication No. 2012/0201005 A1), dated Nov. 7, 2013 (25 pages).

Campbell et al., Office Action for U.S. Appl. No. 12/556,019, filed Sep. 9, 2009 (U.S. Patent Publication No. 2011/0058637 A1), dated Dec. 4, 2013 (17 pages).

FAS Military Analysis Network, "Nuclear Propulsion", Feb. 29, 2000 (8 pages).

Thirakomen, Kecha "Stabilizing Chilled Water Distribution", Ashraei Thailand Chapter Journal 2007-2009, vol. 2, "httep:222/ashraethailand.org/download/ashraethailand_org/journal_2007-2008_40_stabilizing%chilled%20water%20distribution.pdf" (pp. 27-31).

Barringer et al., Office Action for U.S. Appl. No. 12/556,040, filed Sep. 9, 2009 (U.S. Patent Publication No. 2011/0056675 A1), dated Sep. 26, 2013 (21 pages).

Campbell et al., Notice of Allowance for U.S. Appl. No. 12/556,066, filed Sep. 9, 2009 (U.S. Patent Publication No. 2011/0060470 A1), dated Jul. 3, 2013 (41 pages).

Campbell et al., Office Action for U.S. Appl. No. 12/556,019, filed Sep. 9, 2009 (U.S. Patent Publication No. 2011/0058637 A1), dated Apr. 14, 2014 (17 pages).

Barringer et al., Office Action for U.S. Appl. No. 13/447,457, filed Apr. 16, 2012 (U.S. Patent Publication No. 2012/0201005 A1), dated Apr. 15, 2013.

Barringer et al., Office Action for U.S. Appl. No. 13/795,010, filed Mar. 12, 2013 (U.S. Patent Publication No. 2013/0186612 A1), dated Jun. 16, 2015 (13 pages).

* cited by examiner

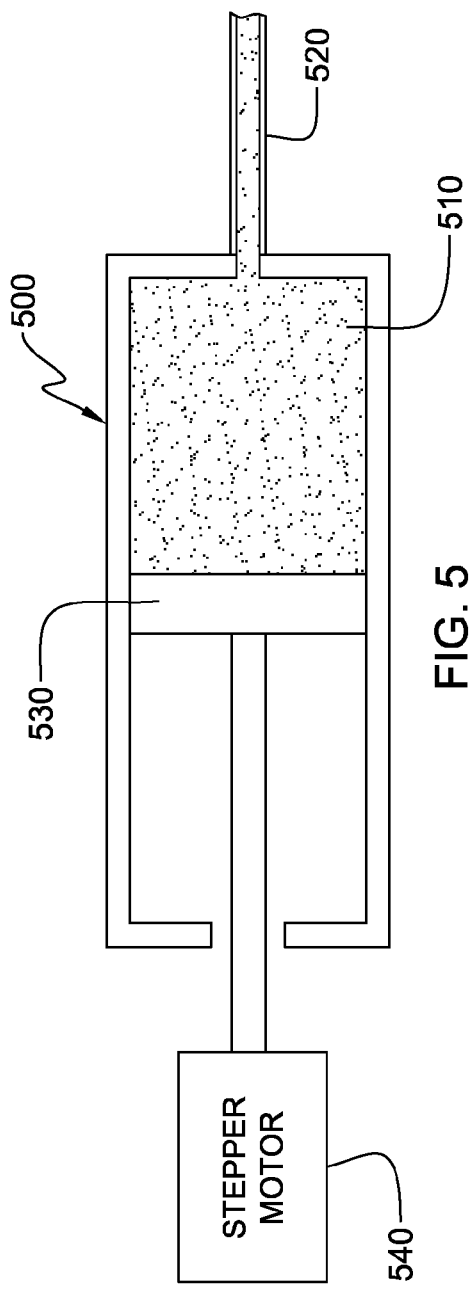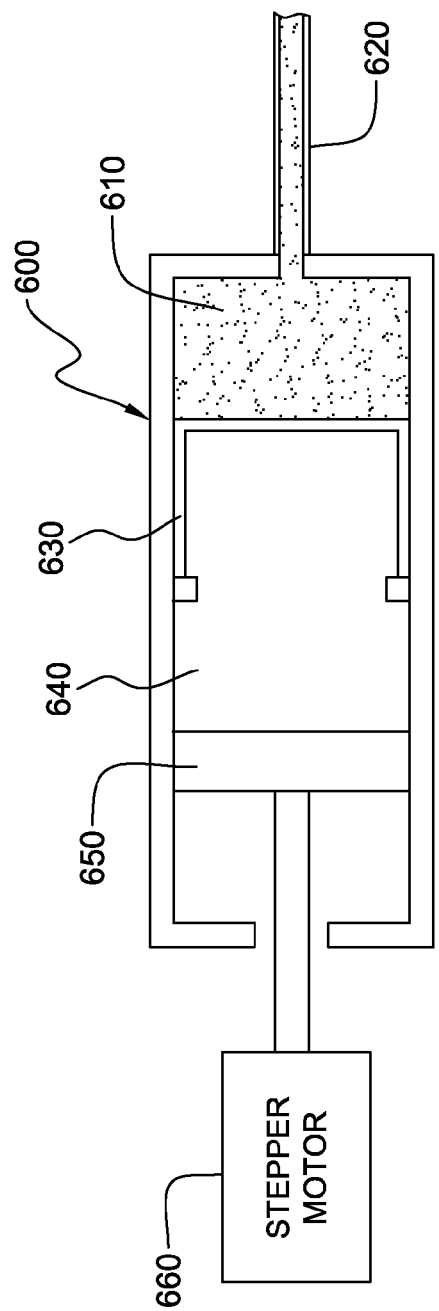

PRESSURE CONTROL UNIT AND METHOD FACILITATING SINGLE-PHASE HEAT TRANSFER IN A COOLING SYSTEM

CROSS-REFERENCE TO RELATED APPLICATION

This application is a divisional of U.S. Ser. No. 12/556,019, filed Sep. 9, 2009, and entitled "Pressure Control Unit And Method Facilitating Single-Phase Heat Transfer In A Cooling System", published Mar. 10, 2011, as U.S. Patent Publication No. 2011/0058637 A1, and which is hereby incorporated herein by reference in its entirety.

BACKGROUND

The present invention relates in general to heat transfer mechanisms, and more particularly, to cooling apparatuses and methods for removing heat generated by one or more electronic devices. Still more particularly, the present invention relates to fluidic cooling apparatuses and methods for cooling one or more electronic devices.

The industry trend has been to continuously increase the number of electronic devices within a computing system environment. Compactness allows for selective fabrication of smaller and lighter devices that are more attractive to the consumer. Compactness also allows circuits to operate at higher frequencies and at higher speeds due to the shorter electrical connection distances in such devices. Despite these advantages, providing many electronic devices in a small footprint can create device performance challenges. One of these challenges is thermal management of the overall environment. Heat dissipation issues, if unresolved, can result in electronic and mechanical failures that will affect system performance, irrespective of the size of the environment.

In many computing environments, microprocessors continue to increase in performance, with the active circuitry of the microprocessor chip being driven to an ever smaller footprint, leading to ever higher heat loads and heat fluxes. Notwithstanding this, reliability constraints often dictate that operating temperature of the devices not exceed a known maximum value.

The existing art has struggled with designing high-performance cooling solutions that can efficiently remove this heat. Conventional cooling solutions depend on conduction cooling through one or more thermal interfaces to an air-cooled heat sink, possibly employing a spreader or vapor chamber. To increase the heat removal capability of air-cooled systems, greater airflow is typically needed. Unfortunately, providing greater airflow is not always possible. Many factors must be taken into consideration in providing ever greater airflow, among which are acoustic noise considerations, as well as power concerns.

As an alternative, liquid cooling methods have recently been incorporated into certain designs. Various types of liquid coolants provide different cooling capabilities. For example, fluids such as refrigerants or other dielectric liquids (e.g., fluorocarbon liquids) exhibit lower thermal conductivity and specific heat properties compared to liquids such as water or other aqueous fluids. Dielectric liquids have an advantage, however, in that they may be in direct physical contact with the electronic devices and their interconnects without adverse effects, such as corrosion or electrical short circuits.

BRIEF SUMMARY

To facilitate employing a dielectric fluid (such as a refrigerant) in single-phase mode within a cooling system, it is desirable that the operating pressure of the coolant be elevated above a saturation pressure to prevent vapor formation, and hence maintain the single-phase operating environment. This is accomplished herein, in one aspect, by maintaining system coolant pressure within the coolant loop above the coolant's saturation pressure for a given operational temperature range or, more particularly, for a maximum operational temperature of the system coolant within a coolant loop of a cooling system.

Briefly summarized, the present invention comprises in one aspect a pressure control unit for facilitating single-phase heat transfer in a coolant loop of a cooling system. The pressure control unit includes: a pressure vessel, having system coolant therein; a pressurizing mechanism, comprising an adjustable piston, associated with the pressure vessel; a coolant line to couple the system coolant in the pressure vessel in fluid communication with the coolant loop of the cooling system; and a regulator mechanism coupled to the pressurizing mechanism to maintain pressure within the pressure vessel at or above a defined pressure threshold. By maintaining pressure within the pressure vessel at or above the defined pressure threshold, pressure within the coolant loop is maintained at or above the defined pressure threshold through supply of system coolant from the pressure vessel into the coolant loop when the coolant line couples the pressure vessel and coolant loop in fluid communication. The defined pressure threshold is set to facilitate system coolant within the coolant loop remaining single-phase throughout an operational temperature range of the system coolant.

In another aspect, a cooling system is provided which includes: at least one liquid-cooled cold plate configured to couple to at least one electronic device to be cooled; a coolant loop in fluid communication with the at least one liquid-cooled cold plate for facilitating flow of system coolant through the at least one liquid-cooled cold plate; and a pressure control unit coupled to the coolant loop for facilitating single-phase system coolant heat transfer through the coolant loop. The pressure control unit includes: a pressure vessel comprising system coolant; a pressurizing mechanism, comprising an adjustable piston, associated with the pressure vessel; a coolant line coupling the system coolant in the pressure vessel in fluid communication with the coolant loop; and a regulator mechanism coupled to the pressurizing mechanism to maintain pressure within the coolant loop at or above a defined pressure threshold through supply of system coolant from the pressure vessel into the coolant loop. The defined pressure threshold is set to facilitate system coolant within the coolant loop remaining single-phase throughout an operational temperature range of the system coolant within the coolant loop.

In a further aspect, a method of facilitating single-phase system coolant heat transfer in a coolant loop of a cooling system is provided. The method includes: coupling a pressure vessel in fluid communication with the coolant loop of the cooling system, the pressure vessel comprising system coolant; providing a pressurizing mechanism comprising an adjustable piston associated with the pressure vessel; and regulating pressure within the pressure vessel via the pressurizing mechanism to maintain the pressure at or above a defined pressure threshold, and thereby maintain pressure within the coolant loop at or above the defined pressure threshold through supply of system coolant from the pressure vessel into the coolant loop, wherein the defined pressure threshold is selected to facilitate system coolant within the coolant loop of the cooling system remaining single-phase throughout an operational temperature range of the system coolant within the coolant loop.

Further, additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 is a schematic of a further embodiment of pressure control unit components for a cooling system, in accordance with an aspect of the present invention;

FIG. 6 is a schematic of another embodiment of pressure control unit components for a cooling system, in accordance with an aspect of the present invention;

DETAILED DESCRIPTION

Figure 1:
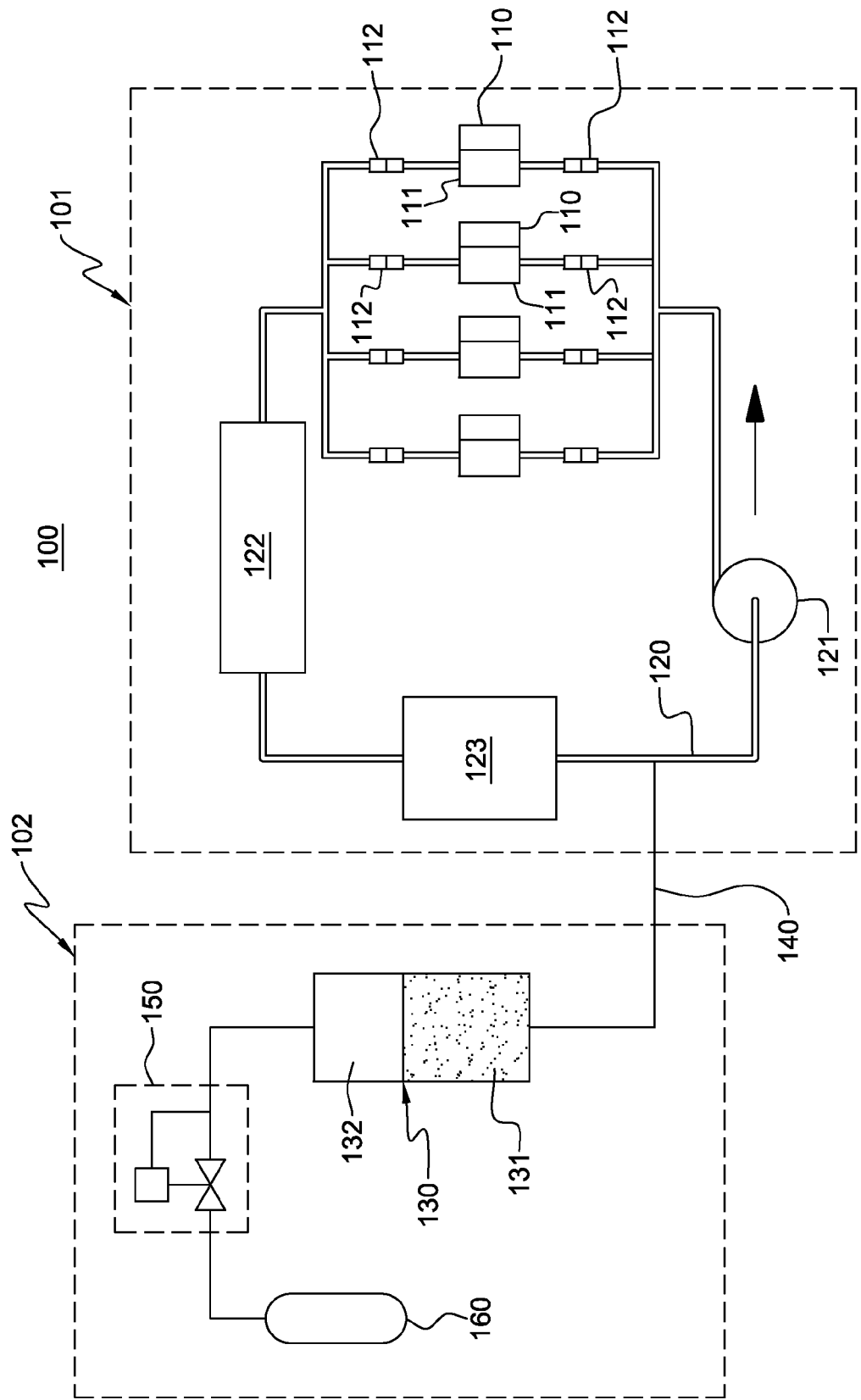
FIG. 1 is a schematic of one embodiment of a cooling system with a pressure control unit, in accordance with an aspect of the present invention.

As used herein, "electronic device" comprises any heat-generating electronic device of a computer system or other electronic system requiring cooling. In one example, the electronic device is or includes an integrated circuit chip, a semiconductor chip and/or any other electronic device requiring cooling, and may either be unpackaged or packaged in an electronic module. As one example, the electronic device may comprise part of an electronic system disposed, for example, in an electronics rack, such as a rack-mounted server system. A "liquid-to-air heat exchanger" means any heat exchange mechanism through which liquid coolant can circulate; and includes, one or more discrete heat exchange devices coupled either in series or in parallel. A heat exchange device may comprise, for example, one or more coolant flow paths, formed of thermally conductive fluid conduit (such as copper, brass or other tubing) in thermal contact with a plurality of air-cooled fins (formed of a thermally conductive material, such as copper). Unless otherwise specified, size, configuration and construction of the liquid-to-air heat exchanger can vary without departing from the scope of the present invention. A "liquid-to-liquid heat exchanger" may comprise, for example, two or more coolant flow paths, formed of thermally conductive tubing (such as copper or other tubing) in thermal or mechanical contact with each other. Size, configuration and construction of the liquid-to-liquid heat exchanger can also vary without departing from the scope of the invention disclosed herein. The term "liquid-cooled cold plate" refers to any thermally conductive structure having one or more channels (or passageways) formed therein for flowing of liquid coolant therethrough.

One example of system coolant employed in a cooling system such as described herein is a dielectric liquid (such as a fluorocarbon or a hydrofluoroether (HFE) liquid) or a refrigerant liquid (such as R-245fa). As explained further below, a pressurized fluid, such as a pressurized gas, is used (in one embodiment) in combination with excess system coolant to facilitate maintaining system coolant within the coolant loop at or above a defined pressure threshold, for example, at or above saturation pressure of the system coolant for a given maximum operational temperature, i.e., a given minimum saturation temperature of the system coolant within the coolant loop of the cooling system. This pressurized fluid may comprise, for example, pressurized air, pressurized nitrogen or other pressurized gas. In one embodiment, the system coolant and the pressurized fluid are immiscible.

As noted, provided herein are a pressure control unit and method for facilitating single-phase heat transfer within a coolant loop of a cooling system. The cooling system described herein employs liquid coolant-based cooling of one or more electronic devices utilizing one or more liquid-cooled cold plates and a coolant loop in fluid communication therewith for facilitating flow of system coolant through the cold plates.

As noted, liquid-cooling of electronic device(s) using a dielectric coolant has one significant advantage over water-based cooling. Should a leak occur, there is no physical harm (or electrical safety concern) due to the dielectric liquid contacting the electronic device or other circuitry. Unfortunately, thermal performance of dielectric coolants is typically poor in comparison with that of water, as set out in Table 1 below.

TABLE 1

| Attribute | Unit | Water | HFE-7200 | R245fa |
|---|---|---|---|---|
| Density | kg/m$^3$ | 998.2 | 1423.5 | 1352.2 |
| Specific Heat | J/kgK | 4182 | 1214 | 1328.3 |
| Thermal Conductivity | W/mK | 0.600 | 0.068 | 0.092 |
| Dynamic Viscosity | mPa_s | 1.003 | 0.673 | 0.432 |
| Relative Figure of Merit |  | 14.3 | 1 | 2.2 |

Equation (1) below can be used to compare the relative laminar heat transfer capability of fluids at a given pumping power, defined as a figure of merit (FOM).

$$FOM = \frac{C_p k}{\mu} \quad (1)$$

In Equation (1), $C_p$ is specific heat, k is thermal conductivity and $\mu$ is dynamic viscosity of the fluid. As can be seen, water has more than an order of magnitude better performance than a representative dielectric coolant such as 3M Corporation's Novec™ Engineered Fluid HFE-7200. Note, however, that the refrigerant R-245fa yields more than twice the performance of that of HFE-7200 using the same figure of merit.

Water-based cooling systems have traditionally operated in single-phase mode. In single-phase mode, the coolant remains liquid throughout. Heat is transferred by sensible means, that is, there is no latent or two-phase heat transfer. A single-phase system is sometimes preferred over a two-phase system and is less expensive to implement. Further, two-phase systems are generally more complex to operate, particularly with respect to flow distribution. However, if a fluid such as R-245fa refrigerant is to be used in single-phase mode, then the system operating pressure needs to be elevated and maintained above atmospheric pressure by as much as 52 psi, as will be apparent to one skilled in the art using available saturation pressure versus saturation temperature graphs for R-245fa. Thus, disclosed herein is a pressure control unit and method for establishing and controlling pressure of system coolant within a coolant loop of an electronic cooling system to prevent vapor formation and hence maintain the single-phase operating environment. This is accomplished by maintaining the system pressure above saturation pressure for a given maximum operating temperature (i.e., a given minimum saturation temperature) of the system coolant within the coolant loop of a given cooling system.

Reference is made below to the drawings, which are not drawn to scale to facilitate understanding of the present invention, wherein the same reference numbers are used throughout different figures to designate the same or similar components.

FIG. 1 illustrates one example of a cooling system, generally denoted 100, in accordance with an aspect of the present invention. As shown, cooling system 100 comprises a liquid-based cooling system 101 and a pressure control unit 102 coupled in fluid communication with a coolant loop 120 of liquid-based cooling system 101. Liquid-based cooling system 101 includes, in this example, multiple electronic devices 110 to be cooled and multiple cold plates 111 coupled thereto. Each cold plate 111 is a liquid-cooled cold plate which is configured to couple to a respective electronic device to be cooled. To facilitate assembly and servicing, quick connect couplings 112 are provided (by way of example) in the individual source and return cold plate branches of coolant loop 120. These quick connect couplings may be a source of pressure loss within the coolant loop since a small amount of system coolant may be lost with each connect or disconnect of a cold plate 111 from coolant loop 120. By way of example, quick connect couplings 112 may comprise any one of various types of commercially available couplings, such as those available from Colder Products Company, of St. Paul, Minn., U.S.A., or Parker Hannifin, of Cleveland, Ohio, U.S.A. System coolant within coolant loop 120 is pumped by a pump 121 through the one or more cold plates 111 of the liquid-based cooling system 101. After passing through the cold plates 111, excess heat is rejected from the system coolant in a heat exchanger 122, which may comprise an air-to-liquid heat exchanger or a liquid-to-liquid heat exchanger, before the coolant is returned to a reservoir 123 in fluid communication with coolant loop 120.

System coolant within coolant loop 120 is maintained pressurized above a defined pressure threshold employing pressure control unit 102. As shown, pressure control unit 102 includes a pressure vessel 130 comprising system coolant 131 and a pressurized fluid 132. A coolant line 140 couples system coolant 131 within pressure vessel 130 in fluid communication with coolant loop 120 of liquid-based cooling system 101. In the embodiment illustrated, this coupling is at the suction side of pump 121 (by way of example only). The suction side of a coolant pump is typically one location within a coolant loop where the pressure of the system coolant may be at its lowest value.

Pressure control unit 102 further includes a pressurizing mechanism associated with pressure vessel 130. This pressurizing mechanism includes, in the example illustrated in FIG. 1, pressurized fluid 132 and a pressurized fluid source 160, such as a tank of compressed gas. A regulator mechanism 150 is coupled to the pressurizing mechanism to maintain pressure within pressure vessel 130 above the defined pressure threshold, and thereby maintain pressure within the coolant loop at or above the defined pressure threshold by supply of system coolant from pressure vessel 130 into coolant loop 120. As one example, regulator mechanism 150 is a mechanically operated pressure regulator value set to open if pressure drops below the defined pressure threshold. As noted, the defined pressure threshold is set to facilitate system coolant within the coolant loop 120 of liquid-based cooling system 101 remaining single-phase throughout an operational temperature range of the system coolant within the coolant loop. In one specific example, the regulator mechanism is a pressure regulator valve, and the pressurized fluid source 160 is a pressurized tank of nitrogen gas. The tank of nitrogen gas is assumed to be significantly higher in pressure than the desired system coolant operating pressure (i.e., the defined pressure threshold), with the pressure regulator valve maintaining pressure within the pressure vessel at or above the desired pressure. In the case of an R-245fa system coolant, that pressure might be 52 psig for a maximum operating temperature of 60° C.

Figure 2:
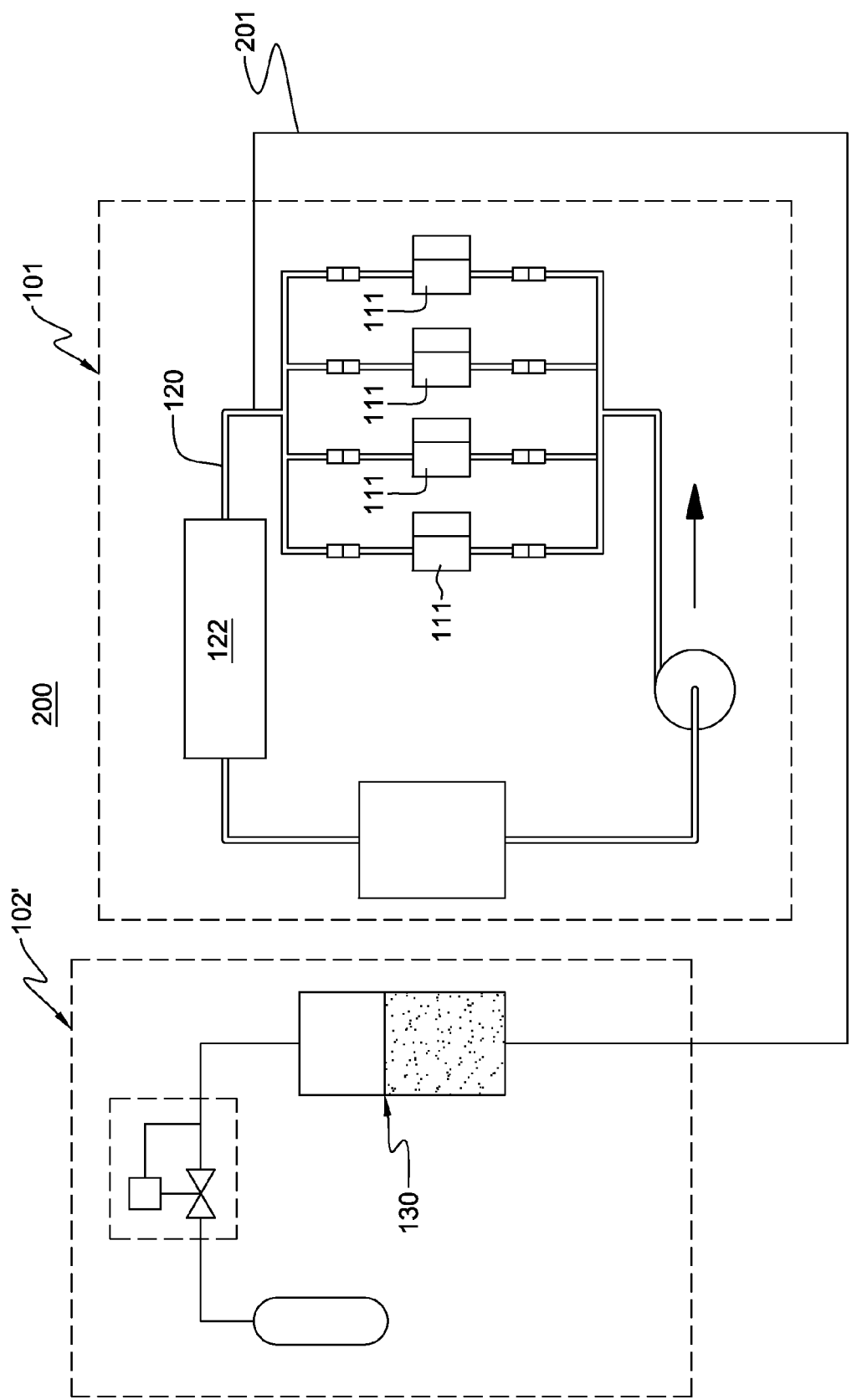
FIG. 2 is a schematic of an alternate embodiment of a cooling system with a pressure control unit, in accordance with an aspect of the present invention.

Note that various modifications to the pressure control unit depicted in FIG. 1 are possible. For example, rather than employing a separate pressure vessel 130, reservoir 123 within the liquid-based cooling system could itself be the pressure vessel described herein. Further, the concepts disclosed herein are applicable to any combination of parallel and/or series connected cold plates 111. Also, fluid connection from pressure vessel 130 into coolant loop 120 can be to any part of the coolant loop. This is illustrated in FIG. 2, wherein a cooling system 200 is shown to comprise liquid-based cooling system 101, described above in connection with FIG. 1, and a pressure control unit 102' such as pressure control unit 102 described above in connection with FIG. 1. The difference between the cooling system embodiments of FIGS. 1 & 2 is that coolant line 201 coupling pressure vessel 130 of pressure control unit 102' in FIG. 2 is to coolant loop 120 at a location between cold plates 111 and heat exchanger 122 of the liquid-based cooling system 101. By placing the coolant line connection in this location, the resultant system ensures sufficient pressure so that system coolant passing through liquid-cooled cold plates 111 remains single-phase.

Figure 3:
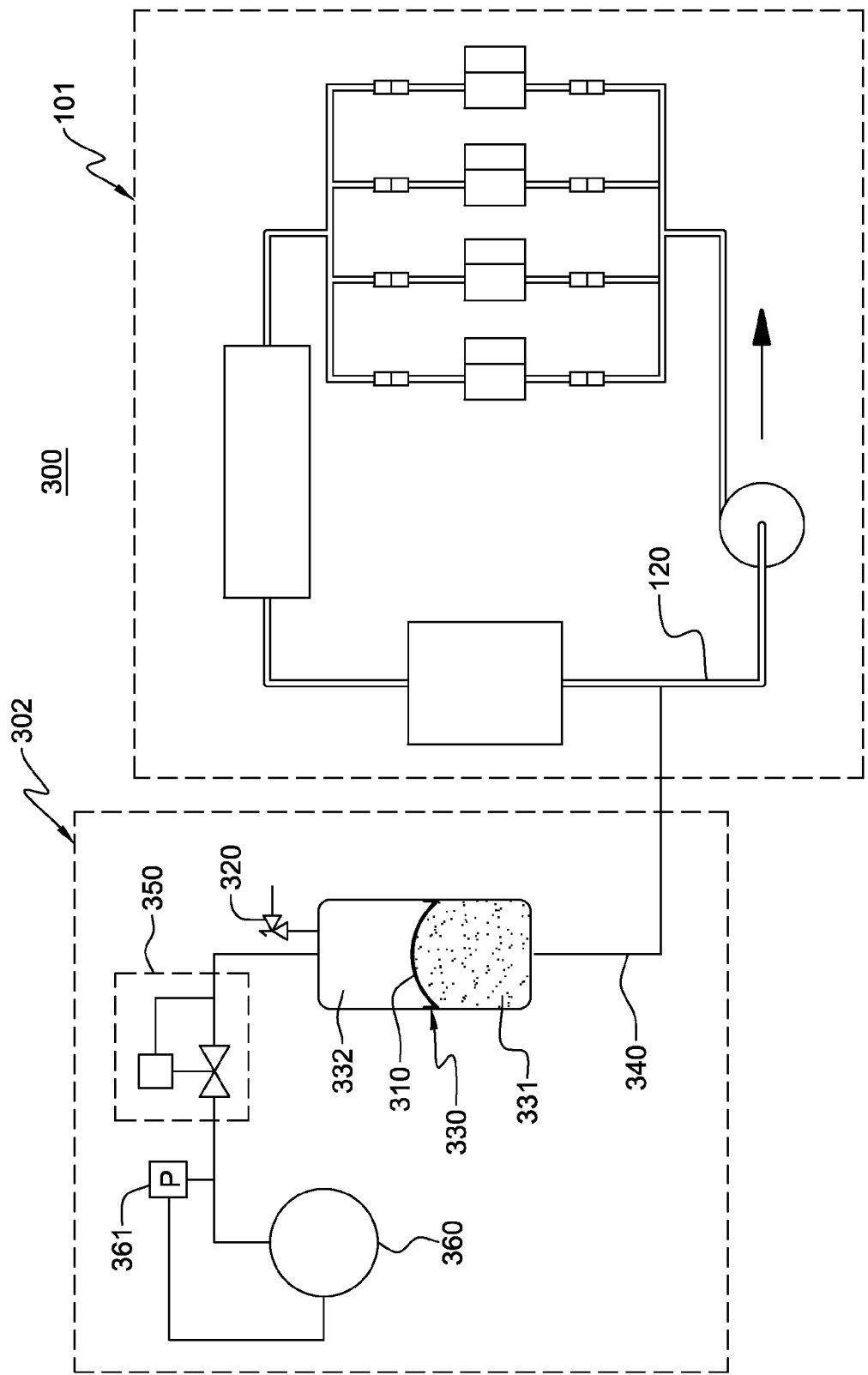
FIG. 3 is a schematic of a further embodiment of a cooling system with a pressure control unit, in accordance with an aspect of the present invention.

FIG. 3 depicts a further embodiment of a cooling system 300, in accordance with an aspect of the present invention. In this embodiment, cooling system 300 includes liquid-based cooling system 101, described above in connection with FIG. 1, and a pressure control unit 302 for facilitating single-phase heat transfer within coolant loop 120 of liquid-based cooling system 101. Pressure control unit 302 includes a pressure vessel 330 comprising system coolant 331 and a pressurized fluid 332. In this embodiment, system coolant 331 and pressurized fluid 332 are separated by a flexible bladder 310, for example, a flexible rubber bladder attached to the inner wall of pressure vessel 330. A coolant line 340 couples system coolant 331 in pressure vessel 330 in fluid communication with coolant loop 120 of the cooling system.

By way of example, pressure control unit 302 includes a pressure relief valve 320 coupled to pressure tank 330 for ensuring that pressure within the pressure tank does not exceed an upper limit. The pressurizing mechanism includes (in this example) pressurized fluid 332 and a compressor 360. By way of further example, pressurized fluid 332 is pressurized air, and compressor 360 is activated and deactivated to provide a source of pressurized air to facilitate controlling pressure within pressure vessel 330. A pressure switch 361 is provided for automated activation/deactivation of compressor 360 to ensure a sufficient level of compressed air at the inlet to pressure vessel 330. Regulator mechanism 350 may comprise a pressure regulator valve which automatically mechanically opens and closes to adjust pressure at the inlet to pressure tank 330. As one example, the pressure regulator valve may comprise a spring-loaded valve stem which opens to let pressurized gas into the pressure vessel whenever pressure drops below a defined set point, and closes once pressure within the vessel equals or exceeds the defined set point. Note that in this embodiment, there is no requirement that pressurized fluid 332 and system coolant 331 be immiscible fluids since they are physically separated by flexible bladder 310. A bladder-type pressure vessel (or tank) is well known in the field of water distribution. In the embodiment of FIG. 3, a similar type vessel may be employed as the pressure vessel, with the bladder separating the system coolant and pressurized fluid.

Figure 4A:
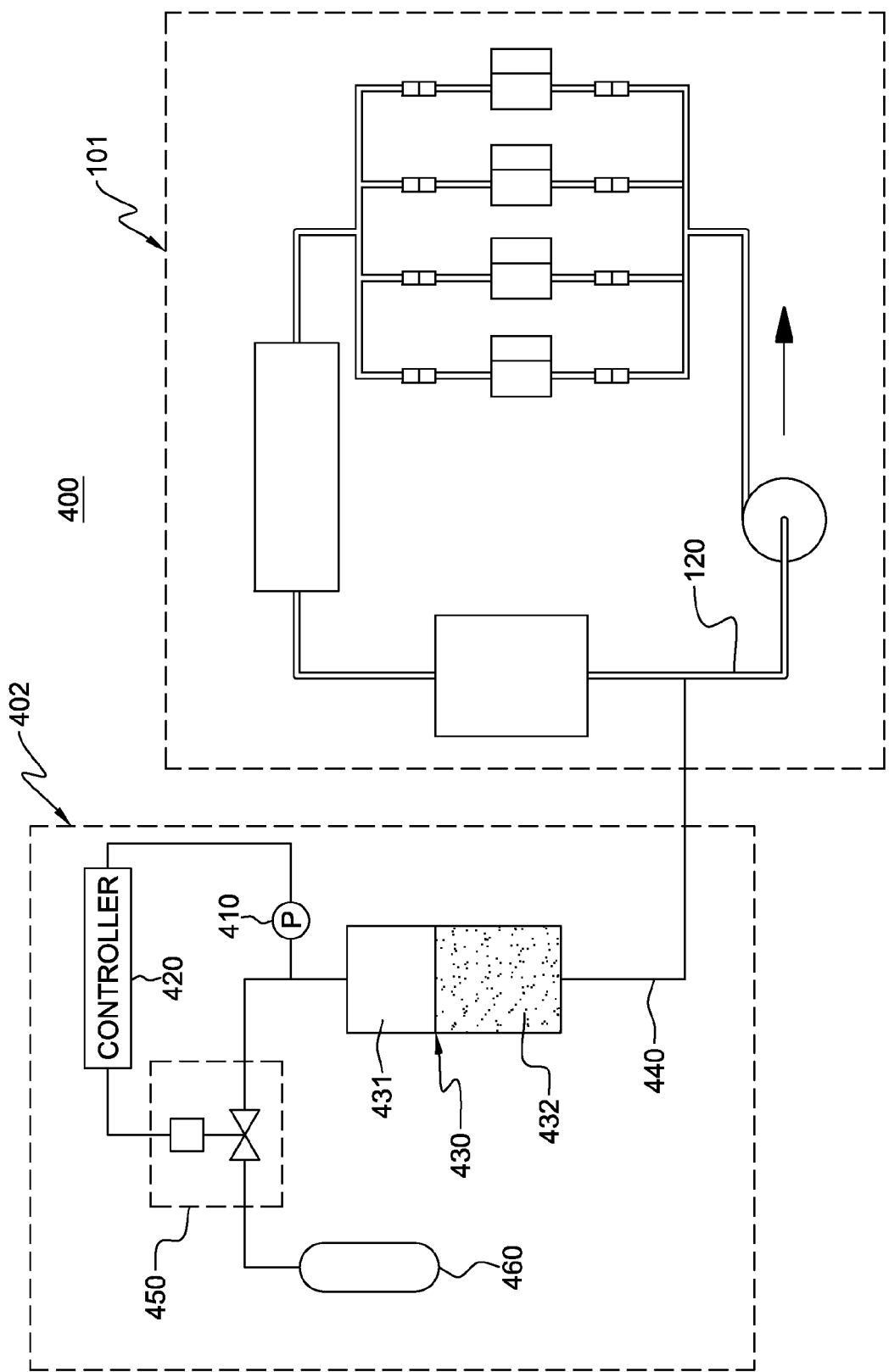
FIG. 4A is a schematic of another embodiment of a cooling system with a pressure control unit, in accordance with an aspect of the present invention.

FIG. 4A illustrates a further embodiment of a cooling system 400, in accordance with an aspect of the present invention. Cooling system 400 includes a liquid-based cooling system 101 (such as described above in connection with FIG. 1) and a pressure control unit 402. As illustrated, a coolant line 440 couples in fluid communication reserve system coolant 432 within pressure vessel 430 to coolant loop 120 of liquid-based cooling system 101. A pressurized fluid 431 is also shown within pressure vessel 430 to facilitate maintaining system coolant within the pressure vessel at or above a defined pressure threshold. By maintaining system coolant within pressure vessel 430 at or above the defined pressure threshold, system coolant within coolant loop 120 is similarly maintained at or above the defined pressure threshold. In this embodiment, a pressure sensor 410 (e.g., pressure transducer) is coupled to a pressurized fluid inlet to pressure vessel 430 and to a controller 420. Controller 420 is also connected to the regulator mechanism 450, which is coupled between (in this embodiment) a pressurized fluid source 460 and pressure vessel 430. In the illustrated embodiment, regulator mechanism 450 is assumed to comprise an electrically actuated valve (EV). Controller 420 is provided with logic to automatically control and maintain pressure within pressure vessel 430 at or above the defined pressure threshold (P0).

Figure 4B:
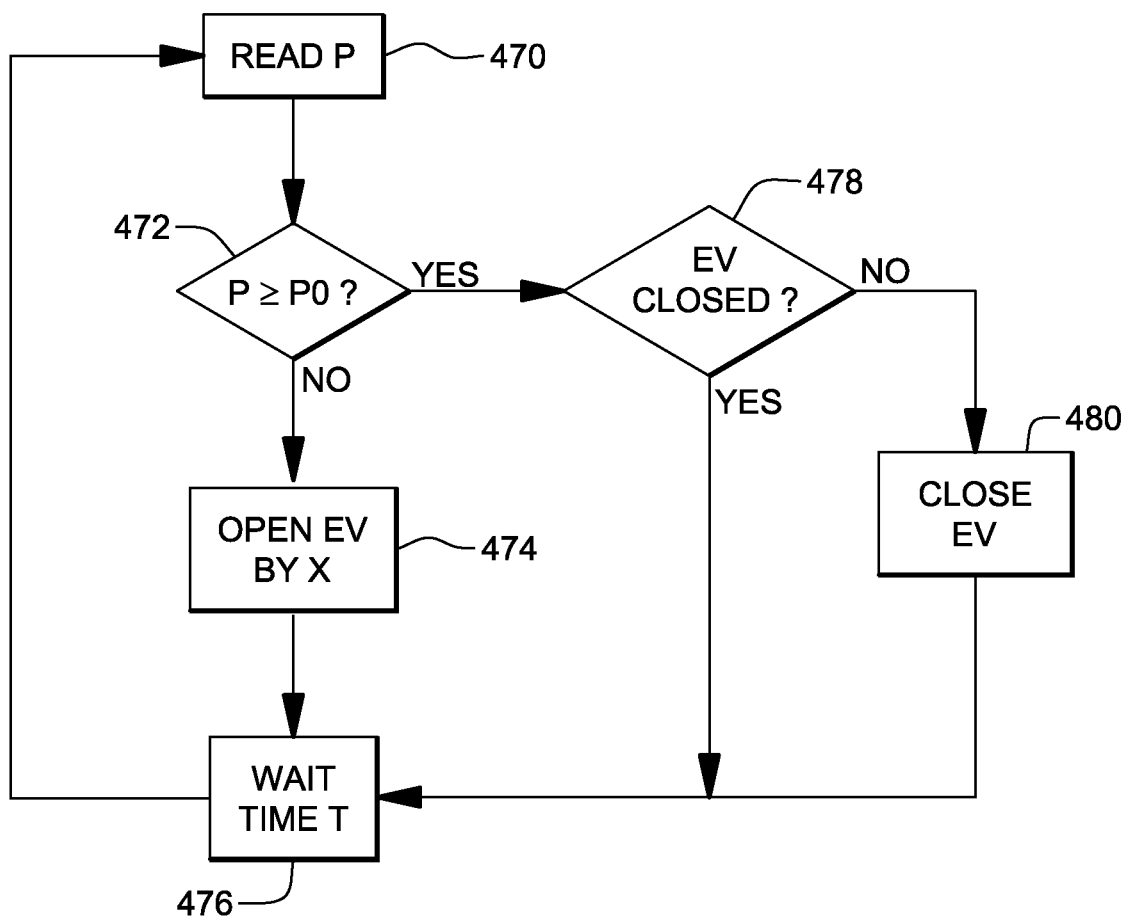
FIG. 4B depicts one embodiment of logic to control pressure within the coolant loop of the cooling system of FIG. 4A, in accordance with an aspect of the present invention.

FIG. 4B illustrates one embodiment of logic to automatically control pressure within pressure vessel 430 of pressure control unit 402 of cooling system 400 illustrated in FIG. 4A. Referring to FIG. 4B, pressure P is read 470 and a determination is made whether pressure P is at or above the defined pressure threshold (P0) 472. If "no", then the electrically actuated valve (EV) of the pressure control unit is opened by a set amount "x" 474, and the logic waits a defined time T 476 before again reading pressure P 470. If pressure P is above the defined pressure threshold (P0), then the controller logic determines whether the electrically actuated valve (EV) is closed 478, and if "yes", waits time T 476 before again reading pressure P 470. If the electrically actuated valve is not closed, then the valve is closed 480, and control logic waits time T 476 before again reading pressure P 470.

FIGS. 5 & 6 depict alternate embodiments of a pressure control unit approach, in accordance with an aspect of the present invention.

In FIG. 5, a pressure control unit approach is illustrated comprising a pressure vessel 500 which includes system coolant 510 and has a coolant line 520 connected thereto which is sized and configured to couple the system coolant within the pressure vessel to a coolant loop of a cooling system (not shown). In this embodiment, a piston 530, positioned within pressure vessel 500, is driven by a stepper motor 540. A controller (not shown) automatically controls stepwise extension or retraction of piston 530 based on a pressure associated with pressure vessel 500 or the pressure of system coolant within the coolant loop of the cooling system to which the pressure control unit is coupled. Note that this embodiment assumes that there is elasticity in the coolant loop of the cooling system, for example, the coolant loop comprises rubber or flexible plastic hoses.

In FIG. 6, a piston 650 and stepper motor 660 arrangement are illustrated, with a pressurized fluid 640 (such as dry air or nitrogen gas) shown disposed between a flexible bladder 630 and system coolant 610 within pressure vessel 600. A coolant line 620 is sized and configured to couple system coolant 610 within pressure vessel 600 with a coolant loop of a cooling system (not shown). As noted above, this coupling to the coolant loop can be to any location in the coolant loop.

Figure 7A:
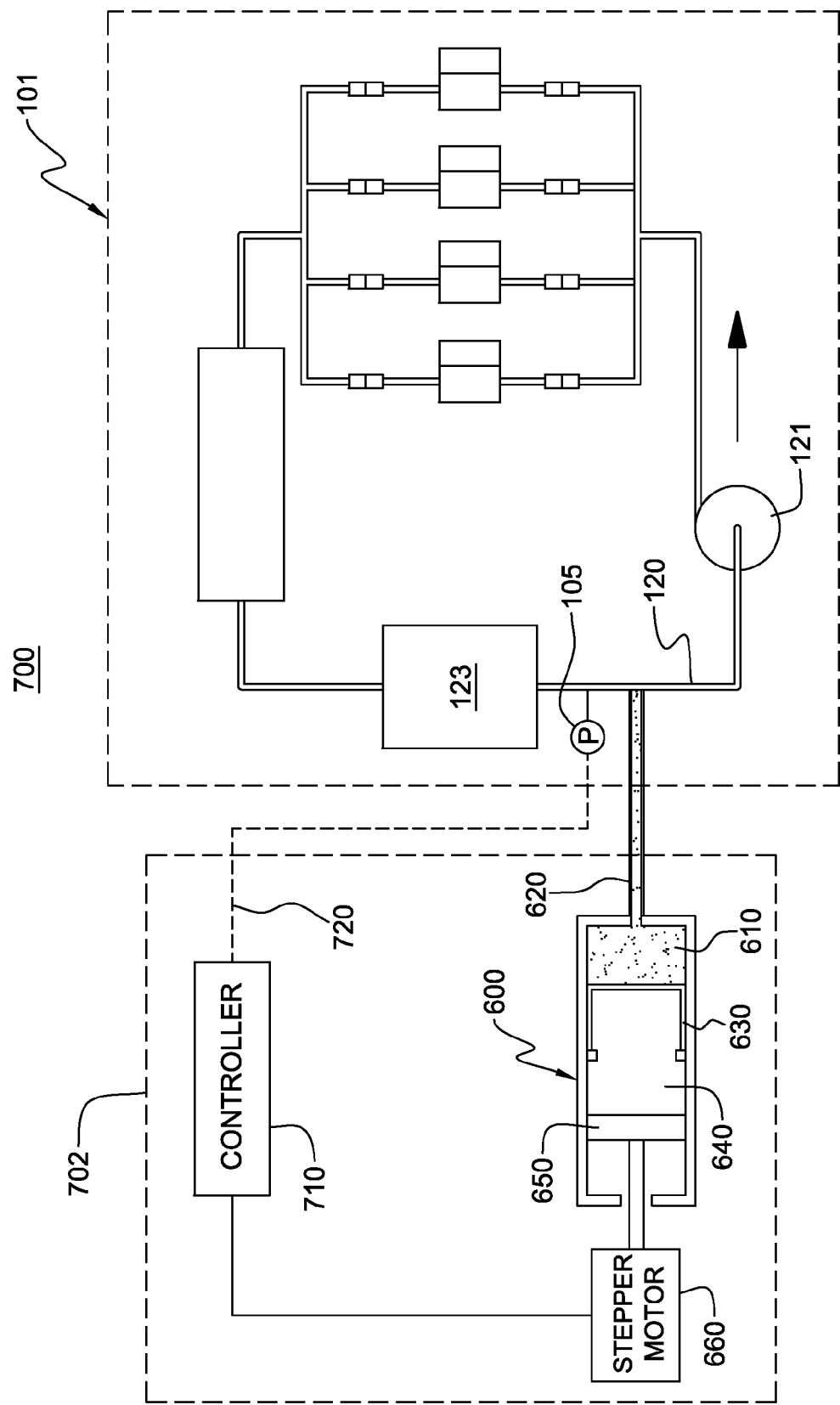
FIG. 7A is a schematic of one embodiment of a cooling system utilizing the pressure control unit approach of FIG. 6, in accordance with an aspect of the present invention.

FIG. 7A depicts one embodiment of a cooling system 700 employing the components of the pressure control unit approach depicted in FIG. 6. Cooling system 700 includes liquid-based cooling system 101 (described above in connection with FIG. 1) and a pressure control unit 702. As shown, pressure control unit 702 includes a pressure vessel 600 which comprises system coolant 610 coupled via a coolant line 620 in fluid communication with coolant loop 120 of liquid-based cooling system 101. In this embodiment, coolant line 620 couples to coolant loop 120 between pump 121 and reservoir 123, by way of example only. In the depicted pressure control unit, pressure vessel 600 is shown to include a flexible bladder 630 separating system coolant 610 from pressurized fluid 640, such as air or nitrogen gas. Piston 650 is reciprocated via a stepper motor 660 to either increase or decrease system coolant pressure within pressure vessel 600. A controller 710 is coupled to stepper motor 660 for automatically controlling movement of piston 650 within pressure vessel 600, and a pressure sensor 105 is provided between reservoir 123 and pump 121 (in this example) to sense pressure of system coolant within coolant loop 120 of liquid-based cooling system 101. A communication line 720 couples controller 710 and pressure sensor 105 to allow logic within controller 710 to ascertain system coolant pressure within the coolant loop.

Figure 7B:
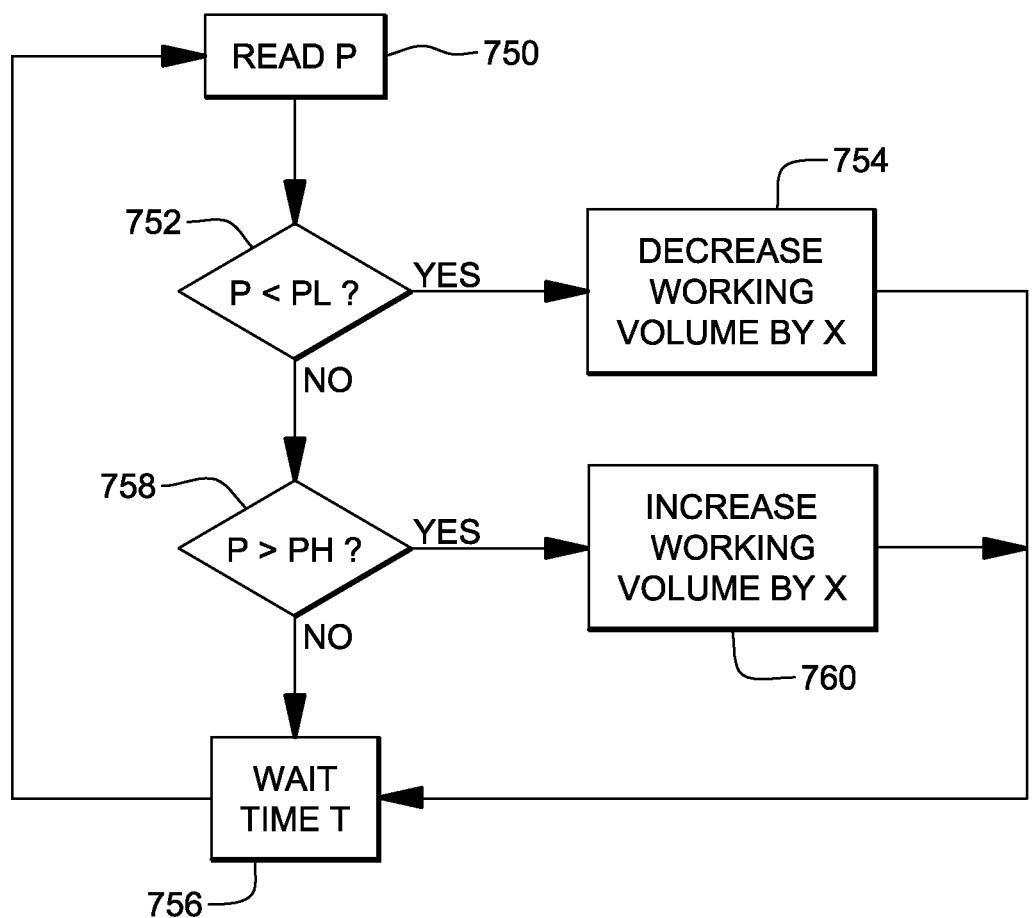
FIG. 7B depicts one embodiment of logic to control pressure within the coolant loop of the cooling system of FIG. 7A, in accordance with an aspect of the present invention.

FIG. 7B depicts one embodiment of logic for facilitating single-phase heat transfer in the coolant loop of the cooling system of FIG. 7A employing the pressure control unit depicted therein. The logic, which is implemented by controller 710, reads pressure P of system coolant within the coolant loop 750, and determines whether pressure P is below a first, low pressure threshold PL 752. If "yes", then the working volume within the pressure vessel is decreased by a set amount "x" 754, with the result of increasing pressure on the system coolant, after which the logic waits a time T 756 before again determining the pressure P within the coolant loop 750. If the read pressure P is greater or equal to the low pressure threshold PL, then the logic determines whether pressure P is above a high pressure threshold PH 758. If "yes", then the working volume within the pressure vessel is increased by the set amount "x" 760, with the result of reducing pressure on the system coolant within the pressure vessel, and thus, reducing pressure on system coolant within the coolant loop of the cooling system, for example, by drawing system coolant from the coolant loop into the pressure vessel.

Note that the above-described cooling systems, pressure control units and methods are provided by way of example only. Numerous variations to the embodiments disclosed herein are possible without departing from the scope of the present invention. For example, the control logic to adjust pressure within the pressure vessel, and hence, within the coolant loop, could sense pressure at an inlet or outlet of the pressure vessel, within the pressure vessel, or at any location within the coolant loop of the cooling system. Further, the system coolant to be maintained single-phase within the coolant loop may comprise any type of liquid coolant appropriate for an electronics cooling system.

Further details and variations on liquid-based cooling apparatuses and methods for cooling electronics systems and/or electronics racks are disclosed in co-filed U.S. patent application Ser. No. 12/556,031, entitled "Control of System Coolant to Facilitate Two-Phase Heat Transfer in a Multi-Evaporator Cooling System", issued Dec. 4, 2012, as U.S. Letters Pat. No. 8,322,154 B2, and co-filed U.S. patent application Ser. No. 12/556,053, entitled "System and Method for Facilitating Parallel Cooling of Liquid-Cooled Electronics Racks", issued Jun. 26, 2012, as U.S. Letters Pat. No. 8,208,258 B2, and co-filed U.S. patent application Ser. No. 12/556,066, entitled "Cooling System and Method Minimizing Power Consumption in Cooling Liquid-Cooled Electronics Racks", published Mar. 10, 2011, as U.S. Patent Publication No. 2011/0060470 A1, and co-filed U.S. patent application Ser. No. 12/556,040, entitled "Apparatus and Method for Adjusting Coolant Flow Resistance Through Liquid-Cooled Electronics Rack(s)", published Mar. 10, 2011, as U.S. Letters Patent Publication 2011/0056675 A1, the entirety of each of which is hereby incorporated herein by reference.

As will be appreciated by one skilled in the art, aspects of the controller described above may be embodied as a system, method or computer program product. Accordingly, aspects of the controller may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the controller may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system comprising:
    a cooling system with a coolant loop and a system coolant therein, the system coolant providing single-phase heat transfer through the coolant loop and the coolant loop being a closed loop through which the system coolant circulates;
    a pressure control unit, the pressure control unit comprising:
        a pressure vessel comprising the system coolant;
        a pressurizing mechanism comprising an adjustable piston associated with the pressure vessel;
        a coolant line coupling the system coolant in the pressure vessel in fluid communication with the coolant loop of the cooling system; and
        a regulator mechanism coupled to the pressuring mechanism to maintain pressure within the pressure vessel at or above a defined pressure threshold, and thereby maintain pressure within the coolant loop at or above the defined pressure threshold through supply of system coolant from the pressure vessel into the coolant loop through the coolant line, and wherein the defined pressure threshold is set to facilitate system coolant within the coolant loop of the cooling system remaining single phase throughout an operational temperature range of system coolant within the coolant loop.

2. The system of claim 1, wherein the operational temperature range comprises a maximum operational temperature of the system coolant, and the defined pressure threshold is set higher than saturation pressure of the system coolant at the maximum operational temperature.

3. The system of claim 1, wherein the regulator mechanism comprises a stepper motor coupled to the piston for adjusting position of the piston within the pressure vessel and thus pressure of system coolant within the pressure vessel, and wherein the pressure control unit further comprises:
    a pressure sensor for sensing pressure of system coolant within one of the pressure vessel or the coolant loop of the cooling system; and
    a controller coupled to the pressure sensor and to the stepper motor, wherein the controller controls positioning of the piston within the pressure vessel via the stepper motor to maintain pressure of system coolant within the pressure vessel at or above the defined pressure threshold.

4. The system of claim 1, wherein the cooling system further comprises at least one liquid-cooled cold plate to couple to at least one electronic device to be cooled, the coolant loop being coupled in fluid communication with the at least one liquid-cooled cold plate to allow passage of the system coolant therethrough.

5. A pressure control unit for facilitating single-phase heat transfer in a coolant loop of a cooling system, the pressure control unit comprising
    a pressure vessel comprising system coolant;
    a pressurizing mechanism comprising an adjustable piston associated with the pressure vessel;
    a coolant line to couple the system coolant in the pressure vessel in fluid communication with the coolant loop of the cooling system;
    a regulator mechanism coupled to the pressuring mechanism to maintain pressure within the pressure vessel at or above a defined pressure threshold, and thereby maintain pressure within the coolant loop at or above the defined pressure threshold through supply of system coolant from the pressure vessel into the coolant loop when the coolant line couples the pressure vessel and coolant loop in fluid communication, and wherein the defined pressure threshold is set to facilitate system coolant within the coolant loop of the cooling system remaining single phase throughout an operational temperature range of system coolant within the coolant loop; and
    wherein the pressurizing mechanism further comprises a pressurized fluid disposed within the pressure vessel, and wherein the pressure control unit further comprises:
        a bladder disposed within the pressure vessel separating the system coolant and the pressurized fluid disposed therein, wherein the pressurized fluid is disposed between the bladder and the adjustable piston, and the pressurized fluid comprises a pressurized gas.

6. A method of facilitating single-phase system coolant heat transfer, the method comprising:
    providing a cooling system with a coolant loop and a system coolant therein, the system coolant providing single-phase heat transfer through the coolant loop and the coolant loop being a closed loop through which the system coolant circulates;
    providing a pressure control unit, the providing the pressure control unit comprising:
        coupling a pressure vessel in fluid communication with the coolant loop of the cooling system, the pressure vessel comprising the system coolant;
        providing a pressurizing mechanism comprising an adjustable piston associated with the pressure vessel; and
        regulating pressure within the pressure vessel via the pressurizing mechanism to maintain the pressure at or above a defined pressure threshold, and thereby maintain pressure within the coolant loop at or above the defined pressure threshold through supply of system coolant from the pressure vessel into the coolant loop, wherein the defined pressure threshold is selected to facilitate system coolant within the coolant loop of the cooling system remaining single-phase throughout an operational temperature range of the system coolant within the coolant loop.

7. The method of claim 6, further comprising monitoring pressure of the system coolant within at least one of the pressure vessel or the coolant loop of the cooling system, and wherein the regulating is responsive to the pressure monitoring.

8. The method of claim 6, wherein the operational temperature range of the system coolant within the coolant loop comprises a maximum operational temperature, and the method further comprises setting the defined pressure threshold higher than saturation pressure of the system coolant at the maximum operational temperature.

* * * * *